May 2, 1967     D. B. BALDRIDGE     3,317,906
LAMINATED GLASS HAVING ELECTRICALLY OPERATED
INSTRUMENT INDICATOR MEANS
EMBEDDED IN THE INTERLAYER
Filed July 13, 1964
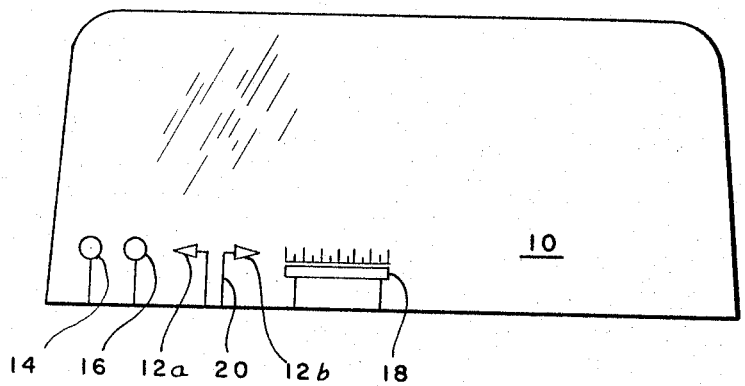
Fig. I
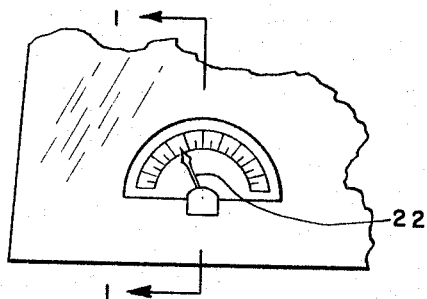
Fig. II
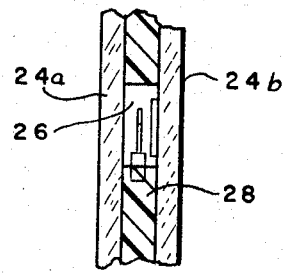
Fig. III
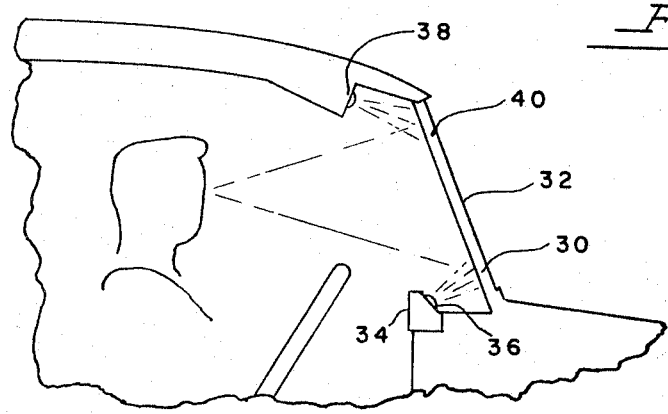
Fig. IV
DONALD B. BALDRIDGE     *INVENTOR.*
BY *James C. Logomasini*
ATTORNEY United States Patent Office 3,317,906
Patented May 2, 1967

3,317,906
LAMINATED GLASS HAVING ELECTRICALLY OPERATED INSTRUMENT INDICATOR MEANS EMBEDDED IN THE INTERLAYER
Donald B. Baldridge, Trenton, Mich., assignor to Monsanto Company, St. Louis, Mo., a corporation of Delaware
Filed July 13, 1964, Ser. No. 382,006
5 Claims. (Cl. 340—366)

The present invention relates to safety glass laminates and methods for preparing them. More particularly, this invention relates to laminated glass having instrument indicator means incorporated therein.

Present day safety glass laminates generally comprise two or more glass panels with a plastic transparent layer interposed between each of the glass panels. The interlayer conventionally used is composed of a plasticized polyvinyl acetal resin. These laminates are designed to cushion the force of impact against objects which strike it while practically eliminating the danger of flying glass. The most important application for laminates of this type are as windshields for automobiles, military vehicles, aircraft, etc.

The present trend in automotive design is towards increased windshield spans to afford greater visibility and increased safety protection. It has been found that the windshield span can be further increased by incorporating the instrument indicator means normally located on the dashboard within the windshield laminate. Even in existing windshield spans, incorporating the instrument indicator means in the windshield provides improved readability and more important, the indicators can be read with little or no distraction from the road.

Accordingly, it is the principal object of this invention to provide an improved laminate.

A further object of this invention is to provide an improved safety laminate having instrument indicator means incorporated therein.

A further object of this invention is to provide method and means by which to attain the preceding objects.

Other objects of this invention will in part be obvious and will in part appear hereinafter.

These and other objects are attained by interposing a plastic interlayer and instrument indicator means between a pair of pellucid panels. The instrument indicator means, in general, refers to the type of indicators normally located on vehicular dash panels. More specifically, the "instrument indicator means" refers only to the indicator portion of the instrument or transducer, for example, indicator lights, movable arrows associated with a calibrated scale, gauge, etc. which disclose to a viewer the instantaneous measurement of some variable associated with the operation of the vehicle.

The instrument or the device which actuates the indicator in response to a signal received from a sensing element may also be incorporated in the laminate or remotely situated depending on its construction, size and convenience. In most instances, it is generally more practical to position the indicator within the laminate and the instrument outside the laminate utilizing an electrical, magnetic, light wave, mechanical or other connection.

For a fuller understanding of the nature and objectives of the invention, reference should be had to the following detailed description taken in connection with the accompanying drawings, in which:

FIGURE I is a front view illustrating an embodiment of the present invention wherein instrument indicator means are incorporated in a laminate.

FIGURE II is an exploded fragmentary front view illustrating a speedometer scale and indicator needle within a laminate.

FIGURE III is a fragmentary sectional view along line 1—1 of FIGURE II looking in the direction of the arrows and illustrating another view of the speedometer scale and needle.

FIGURE IV illustrates another embodiment wherein light waves are focused on light sensitive substances incorporated in a windshield.

Referring in detail to the figures of the drawings, and more specifically FIGURE I, there is schematically shown a windshield laminate 10 which has certain instrument indicator means incorporated within the laminate. More specifically, the laminate 10 comprises a pair of glass panels with a transparent plastic interlayer interposed. The plastic interlayer serves to bond the panels of glass together and to hold the indicator devices in place. The indicator devices illustrated in FIGURE I include turn signal lights 12a and 12b, oil and generator signal lights 14 and 16, respectively, and a speed indicating device 18. The lights and speed indicator are activated electrically by a source of power, not shown, via wires 20 connecting the various signal means.

FIGURES II and III illustrate another embodiment wherein an electro-magnetically operated needle 22 and a calibrated scale are sandwiched between a pair of pellucid panels 24a and 24b in a circular space 26 provided within the plastic interlayer 28.

FIGURE IV illustrates an embodiment wherein a light sensitive material 30 is incorporated in the windshield 32 of an automobile. An instrument 34, having a lens 36 focused on the light sensitive material 30, transmits light waves according to signals received by the instrument. An added advantage of this system is that the light sensitive material incorporated in the windshield may be transparent. Consequently, the windshield can be maintained relatively free of visual obstructions. If desired, the light sensitive material and the focusing means may be positioned at the upper portion of the windshield. FIGURE IV also illustrates the latter embodiment wherein an instrument 38 affixed to a roof portion of the automobile is focused on light sensitive material 40 which is incorporated in the top portion of the windshield 32. The light sensitive material may be any substance which is subject to a visual change or which will fluoresce when exposed to light waves such as ultraviolet, visible or infrared. Furthermore, other materials may be used which are subject to visual change or which will fluoresce when exposed to other forms of radiant energy, i.e., heat. The instrument which is positioned outside the windshield may be any type capable of transmitting the particular form of radiant energy which will sensitize or cause the material or substance incorporated within the laminate to undergo a visual change. These materials or substances which are incorporated within the laminate are considered to be the "instrument indicator means," as defined herein. The materials or substances are activated by a remote source as described above. Materials and substances which are considered to be within the purview of this embodiment include those which reflect as well as those which fluoresce. For example, silvery particles or a silvery screen may be incorporated within the laminate to reflect a signal reading on a remotely positioned instrument.

The above description and particularly the drawings are set forth for the purpose of illustration and not for the purpose of limitation. Any indicator which can be made sufficiently compact to be placed between the panels of a laminate, such as described, may be utilized in the practice of this invention. Typical indicators include turn signal, generator, oil and speed indicating lights or arrows and the like. Indicators more commonly employed in other modes of transportation are also within the scope of this invention, for example, altimeters, barometers, radar instruments, etc. more commonly employed in aircraft.

The laminated unit is manufactured by interposing an interlayer of organic plastic between a pair of pellucid panels and bonding the resulting assembly together. If the indicator component is relatively thin when compared to the thickness of the plastic interlayer, the component can generally be placed between the plastic interlayer and the glass plate. The high heats utilized during the subsequent bonding operation will cause the indicator to embed in the plastic. As an alternate method, portions of the plastic interlayer may be cut to provide a recess for the indicator. Another method, which is sometimes desirable, is to laminate the indicator means between two layers of plastic between the two plates of glass.

The wires which are sometimes attached to the instrument indicator means may be relatively thin and will embed in the plastic with little or no difficulty. These wires may be in the form of strands as small or smaller than 0.005 of an inch in diameter or they may be in the form of very thin and narrow ribbons. However, as earlier noted, the indicator may be activated by other means which do not require wires such as electrical, mechanical, magnetic, radiant energy systems and the like.

As previously indicated, the laminated structure of the present invention comprises a pair of pellucid panels, an interposed layer of non-brittle plastic, and instrument indicator means. The indicator means are connected to an instrument generally located outside the laminate by electrical, magnetic, ultraviolet, radiant energy, mechanical or other suitable means. For automotive applications, such as windshields, the pellucid panels are preferably composed of glass. The plastic interlayer is preferably formed of synthetic resinous material such as, for example, plasticized polyvinyl acetal. However, different plastics varying in thickness and physical characteristics may be employed. When plasticized polyvinyl acetal and more preferably plasticized polyvinyl butyral interlayers are employed between glass panels, the laminates are generally prepared by interposing the interlayer and the instrument indicator means between the glass plates and then subjecting the resulting assembly to a temperature of 200–325° F. and a pressure of 150 to 225 p.s.i. for at least ten minutes to bond the assembly together.

For safety glass, the plastic material generally employed is plasticized polyvinyl acetal and more particularly plasticized polyvinyl butyral. The preferred polyvinyl acetal resins may be made from various unsubstituted aldehydes or mixtures thereof. In general, the acetal resin is made by reacting an aldehyde with hydrolyzed polyvinyl ester in the presence of a solvent for the product and precipitating the resin product with water. More detailed methods for preparing such resins are set forth in Morrison et al. U.S. Patent No. Re. 20,430, issued June 29, 1937, and Lavin et al. U.S. Patent No. 2,496,480, issued Feb. 7, 1950.

In general, the preferred polyvinyl acetal resins employed may be considered to be made up, on a weight basis, of from 5 to 25% hydroxyl groups, calculated as polyvinyl alcohol, 0 to 40% acetate groups, calculated as polyvinyl acetate, and the balance substantially acetal. When the acetal is butyraldehyde acetal, the polyvinyl acetal resin will preferably contain, on a weight basis, from 16 to 25% hydroxyl groups, calculated as polyvinyl alcohol and from 0 to 3% acetate groups, calculated as polyvinyl acetate, the balance being substantially butyraldehyde acetal.

Any suitable plasticizer may be used in preparing the preferred polyvinyl acetal compositions useful as interlayers. In general, the plasticizers which are commonly employed are esters of a polybasic acid or a polyhydric alcohol. Among the suitable plasticizers are triethylene glycol di(2-ethyl butyrate), triethylene glycol dihexoate, glyceryl mono-oleate, dibutyl sebacate and di(beta-butoxyethyl) adipate, dialkyl phthalates, i.e., dioctyl phthalate, dibutoxy ethyl phthalate, etc.

The amount of plasticizer to be added to the preferred polyvinyl acetal resin may be varied within wide limits. Mixtures containing up to 100 parts of plasticizer per 100 parts of polyvinyl acetal resin may be used with satisfactory results. However, for general safety laminate use, the plasticizer content should be between 15 to 60 parts per 100 parts of polyvinyl acetal resin and more preferably 20 to 50 parts per 100 parts of polyvinyl acetal resin.

The preferred plastic interlayers which are employed in the practice of this invention are attained by comalaxing polyvinyl acetal resin with a compatible plasticizer. The resulting mixture is then shaped into film or sheets by any conventional film forming means such as extrusion, roll milling, hot pressing, etc. or may even be solvent-cast if desired. In general, the interlayer thicknesses for safety glass use are in excess of 0.010″. The laminates conventionally used for windshields of automobiles are generally about 0.015″ thick. However, laminates are being prepared for various applications where the interlayer thickness varies anywhere from 0.010″ up to 0.065″.

Incorporating the instrument indicators in the laminate in the manner described will lead to a greater consciousness of the instruments, particularly in automobiles, aircraft, etc. Furthermore, it is possible to eliminate the dash panel and to extend the laminated glass over the area formerly occupied by a dash panel thereby improving crash protection. In addition, mounting the instrument indicators within the laminate provides greater ease in construction, fabrication and installation. Not only may the featured indicator systems be incorporated in front windshields, but also in other locations, for instance, the rear window of the automobile to provide twin signal lights which are more readily apparent to both the occupant and the vehicle following.

It will thus be seen that the objects set forth above, among those made apparent from the preceding description, are effectively attained and, since certain changes may be made in carrying out the above method and in the construction set forth without departing from the scope of the invention, it is intended that all matter contained in the above description shall be interpreted as illustrative and not in a limiting sense.

What is claimed is:

1. An improved laminate comprising a pair of pellucid panels, an interposed plastic interlayer and at least one electrically operated instrument indicator means embedded in the plastic interlayer.

2. The improved laminate according to claim 1, said instrument indicator means being a light electrically connected to an instrument.

3. An improved laminate comprising a pair of glass panels, an interposed plasticized polyvinyl acetal interlayer, and at least one electrically operated instrument indicator means embedded in the plastic interlayer.

4. The improved laminate according to claim 3, said plasticized polyvinyl acetal interlayer being plasticized polyvinyl butyral.

5. An improved laminate comprising a pair of pellucid panels, an interposed plastic interlayer and an electrically operated instrument indicator embedded in the plastic interlayer, said instrument indicator comprising an electromagnetically operated needle and a calibrated scale.

References Cited by the Examiner

UNITED STATES PATENTS

| | | | |
|---|---|---|---|
| 2,337,275 | 12/1943 | Ryan | 156—99 |
| 2,430,690 | 11/1947 | Spengler | 296—84 X |
| 2,534,102 | 12/1950 | Buckley et al. | 161—199 |
| 2,552,955 | 5/1951 | Gaiser et al. | 296—84 X |
| 2,623,182 | 12/1952 | Russell | 250—72 |
| 2,809,316 | 10/1957 | Jeges. | |
| 3,096,458 | 7/1963 | Demmy | 240—2.25 X |
| 3,142,755 | 6/1964 | Leroux | 250—72 X |
| 3,208,070 | 9/1965 | Boicey | 296—84 X |

NEIL C. READ, *Primary Examiner.*

I. J. LEVIN, *Assistant Examiner.*